(12) United States Patent
Canterberry et al.

(10) Patent No.: US 6,983,956 B2
(45) Date of Patent: Jan. 10, 2006

(54) DUAL STAGE PYROTECHNIC INFLATOR

(75) Inventors: J B Canterberry, Apollo Beach, FL (US); Keith Lam, Lakeland, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 127 days.

(21) Appl. No.: 10/640,031

(22) Filed: Aug. 14, 2003

(65) Prior Publication Data
US 2005/0035579 A1    Feb. 17, 2005

(51) Int. Cl.
*B60R 21/28* (2006.01)
(52) U.S. Cl. .................................................. 280/741
(58) Field of Classification Search ............... 280/736, 280/741, 740
See application file for complete search history.

(56) References Cited

U.S. PATENT DOCUMENTS

| | | | |
|---|---|---|---|
| 3,972,545 A | 8/1976 | Kirchoff et al. | |
| 5,505,488 A * | 4/1996 | Allard | 280/740 |
| 6,189,927 B1 * | 2/2001 | Mossi et al. | 280/741 |
| 6,199,906 B1 | 3/2001 | Trevillyan et al. | 280/741 |
| 6,290,256 B1 * | 9/2001 | McFarland et al. | 280/736 |
| 6,764,096 B2 * | 7/2004 | Quioc | 280/736 |
| 2002/0101068 A1 | 8/2002 | Quioc | |
| 2003/0030259 A1 | 2/2003 | Saso et al. | 280/741 |

FOREIGN PATENT DOCUMENTS

EP    1057514 A    12/2000
JP    11059318    6/1999

* cited by examiner

*Primary Examiner*—Faye M. Fleming
(74) *Attorney, Agent, or Firm*—Lonnie Drayer; Jarett Rieger

(57) ABSTRACT

The inflator has a first combustion chamber and a second combustion chamber. Gas generant contained in the first combustion chamber is independently ignited from gas generant contained in the second combustion chamber. A divider plate extends across the entire inflator dividing the inflator into a first combustion chamber and a second combustion chamber. The divider plate has a generally flat shape associated therewith. A first igniter of the inflator ignites the gas generant in the first combustion chamber, and the inflation gas from the burning of this gas generant passes through only a first filter and then exits the inflator via first exit ports. A second igniter of the inflator ignites the gas generant in the second combustion chamber. The burning of gas generant in the second combustion chamber produces inflation gas which travels through only the second filter and then through second exit ports. The first igniter and the second igniter are disposed on the same end of the inflator.

16 Claims, 3 Drawing Sheets

DUAL STAGE PYROTECHNIC INFLATOR

FIELD OF THE INVENTION

The present invention relates to an inflator for inflating an inflatable cushion and more particularly relates to an inflator that can tailor gas output in accordance with crash severity along with size and position of vehicle occupant.

BACKGROUND OF THE INVENTION

An inflator is utilized in a motor vehicle to rapidly fill an inflatable cushion during a crash. Inflatable cushions are commonly known in the art as airbags. Motor Vehicles typically have multiple airbags that are filled with inflation gas from inflators to protect the vehicle occupants from injuries during a crash. The airbag functions by absorbing the vehicle occupant's kinetic energy in a controlled manner to reduce the deceleration forces experienced by the vehicle occupant.

The inflator is a gas-generating device that rapidly produces inflation gas, which is utilized to fill a folded airbag. The pyrotechnic inflator, a commonly utilized inflator in the safety restraint art, generates inflation gas by burning a gas generant. The gas generant contains a blend of fuel and oxidizer, and upon ignition produces gaseous combustion products. The pyrotechnic inflator may have one or more chambers containing gas generant. A pyrotechnic inflator having gas generant in two chambers, which are ignited independently by two igniters is referred to herein as a dual stage inflator.

The dual stage inflator has several contemplated firing scenarios. First, the first stage is fired whereby a fixed quantity of inflation gas is produced. Second, the first stage is fired and after a predetermined delay, the second stage is fired. Third, the first stage and the second stage are fired simultaneously. The gas output profile, which is a plot of gas pressure in the airbag as a function of time, varies in all of the firing scenarios. The dual stage inflator has the flexibility to tailor the gas output to afford maximum protection to different vehicle occupant sizes and positions.

Many variants of the dual stage inflator have been developed. One variant includes a pancake shaped inflator having a divider plate extending across the length of the inflator dividing the inflator into two stages or combustion chambers. A co-assigned patent, U.S. Pat. No. 6,199,906, along with US 2003/0030259A1 teach a pancake shaped inflator having a first and second gas combustion chambers arranged in a manner where one combustion chamber is stacked on top of the other combustion chamber. Because of the need for dual stage inflators in the safety restraint industry, there is a desire to design cheaper and more reliable dual stage inflators.

SUMMARY OF THE INVENTION

The inflator of the present invention is a dual stage inflator having a first combustion chamber and a second combustion chamber. Gas generant is present in the first combustion chamber, and additionally, gas generant is contained in the second combustion chamber. Gas generant in the combustion chambers is ignited by separate ignition means. The inflator in accordance with the present invention may release inflation gas from only the burning of the gas generant in the first combustion chamber. Moreover, the inflator may release inflation gas from the first or second combustion chamber and after a predefined elapse of time, release gas from the other combustion chamber. Lastly, the inflator may release inflation gas from the first combustion chamber and the second combustion chamber at the same time.

An aspect of the present invention is the inclusion of a divider plate that interfaces with the inner surface of the circumferential joint between the lower housing and the upper housing. The divider plate divides the inflator into a first combustion chamber and a second combustion chamber. The divider plate has a generally flat shape.

Another aspect of the present invention is the use of an enhancer tube. Enhancer material occupies space in the enhancer tube and the ignition of the first igniter ignites the enhancer pellets in the enhancer tube, which in turn ignites the gas generant in the first combustion chamber. The enhancer tube is partially press fit into an opening in the divider plate. Due to the press fit and a cylindrical protrusion extending from the divider plate in the direction of the upper housing, inflation gas from the second combustion chamber can not travel into the first combustion chamber.

Another aspect of the present invention is the use of a first filter and a second filter. The burning of gas generant in the first combustion chamber produces hot inflation gas that travels through only the first filter. Likewise, the burning of gas generant in the second combustion chamber produces hot inflation gas that flows through only the second filter.

BRIEF DESCRIPTION OF THE DRAWINGS

With this summary of the invention, a detailed description follows with reference being made to the accompanying drawings which form part of the specification in which like parts are designated by the same reference numbers and of which.

DETAILED DESCRIPTION OF THE INVENTION

Figure 1:
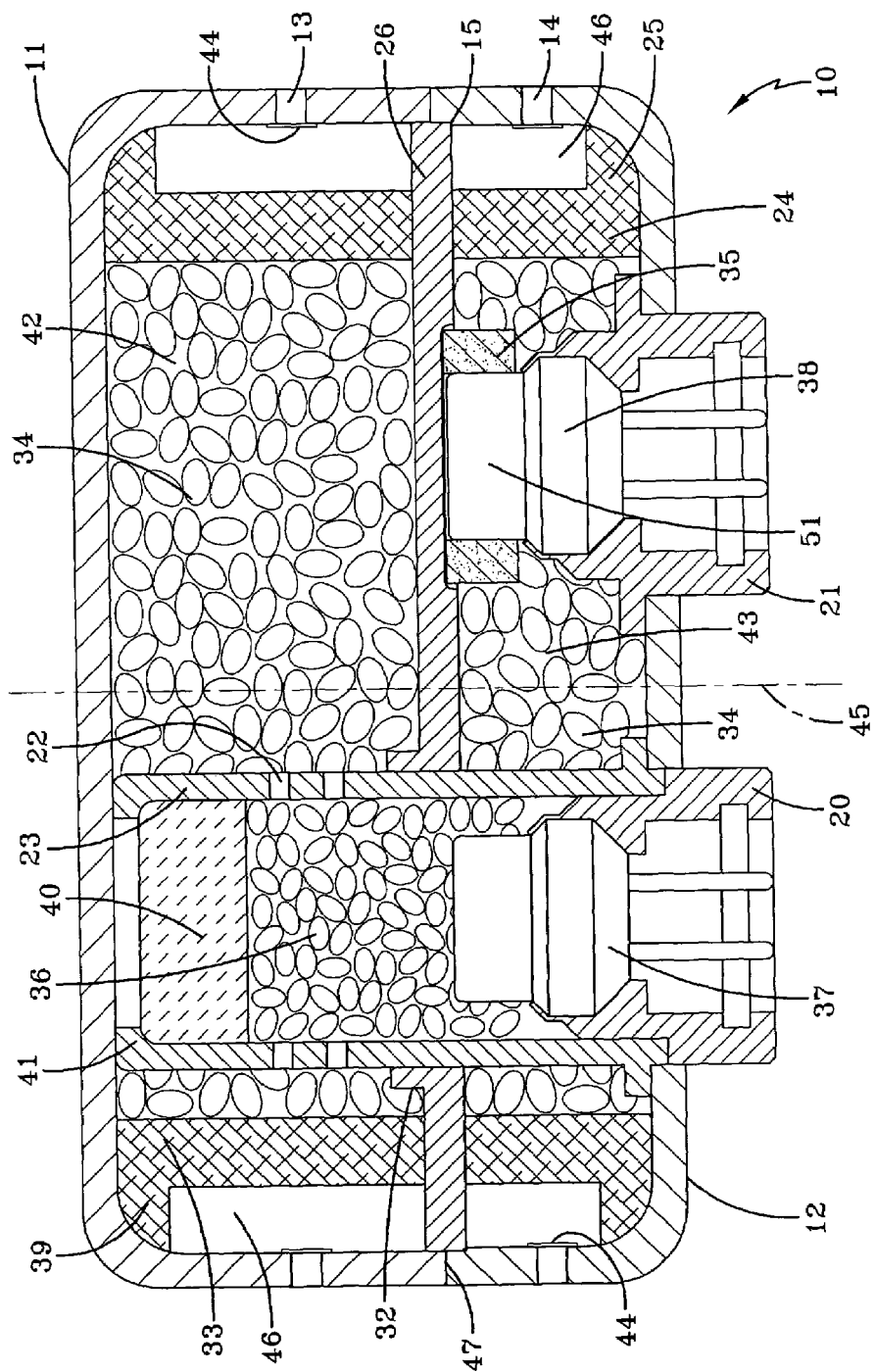
FIG. 1 shows a cross section of the inflator of the present invention.
Figure 2:
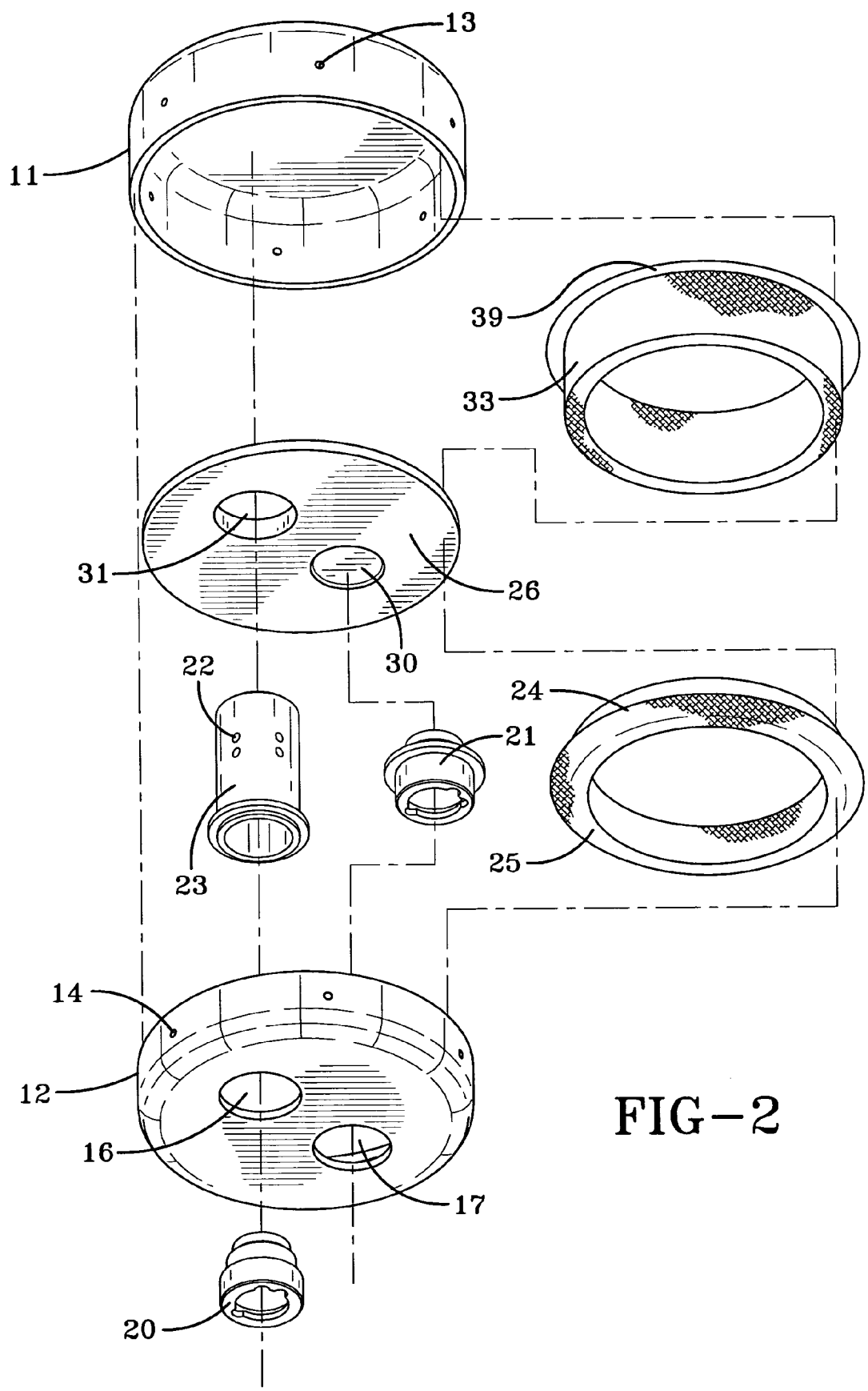
FIG. 2 shows an exploded view of the inflator of the present invention.

With reference to FIGS. 1 and 2, the inflator 10 constructed in accordance with the present invention provides inflation gas to fill a folded airbag (not shown). The inflator 10 has an lower housing 12 fixedly attached to a upper housing 11 via a butt weld or any other suitable means. As used herein and in the claims the terms "upper" and "lower" are understood to refer to the relative locations of components of an inflator when the inflator is assembled. The housings are made from a metallic material such as steel, low carbon steel, and the like. The lower housing has a cup shaped configuration with a plurality of second exit ports 14 arranged around the circumference thereof. Additionally, the lower housing has a first aperture 16 for receiving the first igniter retainer 20 and a second aperture 17 for receiving the second igniter retainer 21. The first aperture 16 has a generally circular shape and likewise, the second aperture 17 has a generally circular shape. The first aperture 16 and the second aperture 17 are both spaced apart from the center axis 45 of the inflator 10. The upper housing 11 also has a cup shaped configuration with a plurality of first exit ports 13 arranged around the circumference thereof. The first exit ports 13 provide a passageway for inflation gas produced from the first combustion chamber 42 to exit the inflator 10, and similarly, the second exit ports 14 provide a passageway for inflation gas from the second combustion chamber 43 to leave the inflator 10.

A first igniter 37 is retained in the first igniter retainer 20 and a second igniter 38 is retained in the second retainer. The first igniter 37 and the second igniter 38 have the same physical components and operate in the same manner, however the first igniter 37 differs from the second igniter 38 in the ignition material load. The first igniter 37 ignites the gas generant 34 in the first combustion chamber 42 while the second igniter 38 ignites the gas generant 34 in the second combustion chamber 43. The inflator 10 shown in FIG. 1 has a first combustion chamber 42 that is larger in volume than the second combustion chamber 43, and hence the ignition material load for the first igniter 37 is greater than for the second igniter 38.

The igniter is in electrical communication with an electronic control unit (not shown) in a vehicle. The electrical igniter has two electrodes insulated from one another. The electrodes have a bridge wire connecting the two electrodes, and the bridge wire is embedded in multiple layers of ignition material such as zirconium potassium perchlorate. The bridge wire has high resistance and as current flow through the bridge wire, the bridge wire generates sufficient heat to ignite the ignition material. The electronic control unit receives electrical signals from one or more crash sensors and vehicle occupant sensors. Once the electronic control until determines a crash is imminent or is occurring, the electronic control unit transmits a firing signal to the igniter, resulting in the firing of the igniter or lighting of the ignition material therein. It is understood that any suitable igniter may be used in the inflator according to the present invention including an igniter employing a semiconductor bridge or any other suitable heating source in place of the bridge wire.

As discussed earlier, the first igniter 37 is retained in the first igniter retainer 20. With reference to FIG. 1, the enhancer tube 23 is press fit to the first igniter retainer 20. The enhancer tube 23 is loaded with enhancer pellets 36, which is a pyrotechnic mixture that is ignited via the first igniter 37. The enhancer pellets 36 rapidly burns to yield hot combustion gases that ignite the first gas generant 34. A spacer 40 is situated in the enhancer tube 23 in the portion nearest the upper housing 11. The spacer 40 is made from a ceramic material or any other suitable material and is employed for anti-abrasion and anti-rattling of the enhancer pellets 36. The enhancer tube 23 has a plurality of enhancer tube holes 22 arranged around the circumference thereof in the region of the enhancer situated within the first combustion chamber 42. The combustion gases produced from the burning of the enhancer pellets 36 travel through the enhancer tube holes 22 into the first combustion chamber 42. The bottom 41 of the enhancer tube 23 is fixedly attached to the upper housing 11 by welding or any other suitable attachment means. This attachment of the enhancer tube 23 to the upper housing 11 precludes the housing from bulging during the time frame of increased combustion pressures during the burning of gas generant.

Gas generant 34 is present in the first combustion chamber 42. The first combustion chamber 42 is defined as the area surrounding the enhancer tube 23 and surrounded by the first filter 33, the divider plate 26, and the upper housing 11. The enhancer pellets 36 from the enhancer tube 23 ignites the gas generant 34 in the first combustion chamber 42. The gas generant is a pyrotechnic material that rapidly burns to produce inflation gas useful for inflating an airbag. The inflation gas produced from the burning of the gas generant 34 in the first combustion chamber 42 travels through only the first filter 33 and exits the inflator 10 via the first exit ports 13. The first filter 33 serves as a heat sink to cool the hot inflation gas. Moreover, the first filter 33 also traps solid particles or slag that is produced from the burning of the gas generant to prevent the solid particles from entering into the airbag cushion. The first filter 33 is made from compressed knitted metal wire or any other suitable material.

With reference to FIG. 2, the first filter 33 has an enlarged portion 39 or an area of increased thickness on a longitudinal end distal from the divider plate 26. The first filter 33 is secured in place as a result of the enlarged portion 39 and the igniter retainers. The first filter 33 may also be secured in position by placing the enlarged portion 39 on the top of the first filter 33. The enlarged portion 39 of the first filter 33 ensures that an air gap or plenum 46 exists between the outer surface of the first filter 33 and the upper housing 11. The plenum 46 is useful to prevent the first filter 33 from possibly clogging exit ports, which may happen if the first filter 33 melts and the first filter 33 is in close proximity or in intimate contact with the upper housing 11. Additionally, the plenum 46 is beneficial because the presence of the plenum 46 facilitates the distribution of inflation gas throughout the first filter 33. Without the plenum 46, the inflation gas might travel in the region of the filter in closest proximity to the first exit ports 13. The first exit ports 13 are covered by a burst foil 44, a thin metallic material, adhesively bonded over the first exit ports 13.

The second igniter 38 ignites an enhancer donut 35, which in turn ignites the gas generant 34 in the second combustion chamber 43. The second igniter 38 is retained in the second igniter retainer 21 via crimping or any other suitable attachment means. The second igniter retainer 21 is attached to the lower housing 12 via welding such as laser welding. As seen in FIG. 1, a recess 30 in the divider plate 26 facing the lower housing 12 partially receives the enhancer donut 35. The enhancer donut 35 is secured in place via a press fit around the metal cup of the second igniter 38. The enhancer donut 35 is made from a pyrotechnic material that burns rapidly. The gas generant 34 in the second combustion chamber 43 occupies the space surrounding the second igniter retainer 21 and the enhancer tube 23. The lower housing 12, the second filter 24, and the divider plate 26 surround the second combustion chamber 43. The second filter 24 has an enlarged portion 25 or an area of increased thickness on a longitudinal end distal from the divider plate 26 creating a plenum 46 between the lower housing 12 and the second filter 24. The second exit ports 14 have a thin metallic burst foil 44 adhesively attached to the lower housing 12 to cover the second exit ports 14.

The divider plate 26 separates the first combustion chamber 42 from the second combustion chamber 43. The divider plate 26 interfaces radially with the inner surface of the circumferential joint 47 between the lower housing 12 and the upper housing 11; the divider plate 26 extends across the entire inflator 10. The divider plate 26 is disposed in the inflator 10 below a plane passing through the second exit ports 14 and a plane passing through the first exit ports 13. The first exit ports 13 in the present invention are arranged on the same plane and similarly the second exit ports 14 are arrange on the same plane. It is contemplated that the first exit ports 13 and the second exit ports 14 may be arranged in two or more rows. Accordingly, the divider plate 26 would be disposed below the plane passing through the highest first exit ports and lowest second exit ports 14. The lower housing 12 has a ledge 15 for assuring proper positioning of the divider plate 26 within the inflator 10. During assembly, the divider plate 26 is placed on the ledge 15 of the lower housing 12; the welding of the lower housing 12 to the upper housing 11 fixedly attaches the divider plate 26 to both the lower housing 12 and the upper housing 11. Approximately half of the thickness of the divider plate 26 is fixedly attached to the lower housing 12 and approximately half of the thickness of the divider plate 26 is fixedly attached to the upper housing 11. The divider plate 26 has an opening 31 therethrough that has substantially the same diameter as the diameter of the outer surface of the enhancer tube 23. The divider plate 26 has a cylindrical protrusion 32 extending from the divider plate 26 toward the upper housing 11. Also contemplated in the present invention is a cylindrical protrusion 32 extending from the divider plate 26 toward the lower housing 12. The purpose of the cylindrical protrusion 32 is to increase the surface area of the divider plate 26 that engages with the enhancer tube 23 thereby reducing the likelihood of sympathetic ignition. Sympathetic ignition occurs when the inflation gas from one combustion chamber ignites the gas generant in the other combustion chamber. Since the enhancer tube 23 is press fit in the divider plate 26 and the divider plate 26 has a cylindrical protrusion 32, there is little chance inflation gas may travel from one combustion chamber to the other combustion chamber through the opening 31. The divider plate 26 also contains a recess 30 for partially receiving an enhancer donut 35. The recess 30 and the opening 31 in the divider plate 26 are disposed in the divider plate 26 off center axis 45.

The inflator 10 in the present invention has two discrete ignition trains. A first igniter 37 initiates the first ignition train while the second igniter 38 ignites the second ignition train. The first igniter 37 and the second igniter 38 each have an ignition material such as zirconium potassium perchlorate. The ignition material from the first igniter 37 ignites the enhancer pellets 36 in the enhancer tube 23 and similarly, the ignition material from the second igniter 38 ignites the enhancer donut 35. The enhancer pellets 36 and the enhancer donut 35 are made from a pyrotechnic material having a fuel and an oxidizer. The fuel may be selected from one or more of the following: triazole, tetrazole, amino tetrazole, nitroguandine, guanidine nitrate, and the like. The oxidizer may be selected from one or more of the following: oxides, nitrates, ammonium nitrate, chlorates, and the like. The enhancer pellets and the enhancer donut may have the same chemical formulation. The enhancer pellets 36 ignites the gas generant 34 in the first combustion chamber 42 and the enhancer donut 35 ignites the gas generant 34 in the second combustion chamber 43. The gas generant is a pyrotechnic material having a fuel and an oxidizer. The fuel may be selected from one or more of the following: triazole, tetrazole, amino tetrazole, nitroguandine, guanidine nitrate, and the like. The oxidizer may be selected from one or more of the following: oxides, nitrates, ammonium nitrate, chlorates, and the like. The enhancer pellets 36, the enhancer donut 35, and the gas generant may be made from the same fuel and oxidizer. The enhancer pellets 36 and the enhancer donut 35 typically burn at a higher temperature than the burning of the gas generant. The purpose of the enhancer pellets 36 is to rapidly ignite the gas generant 34 in the first combustion chamber 42, and the purpose of the enhancer donut 35 is to rapidly ignite the gas generant 34 in the second combustion chamber 43.

Figure 3:
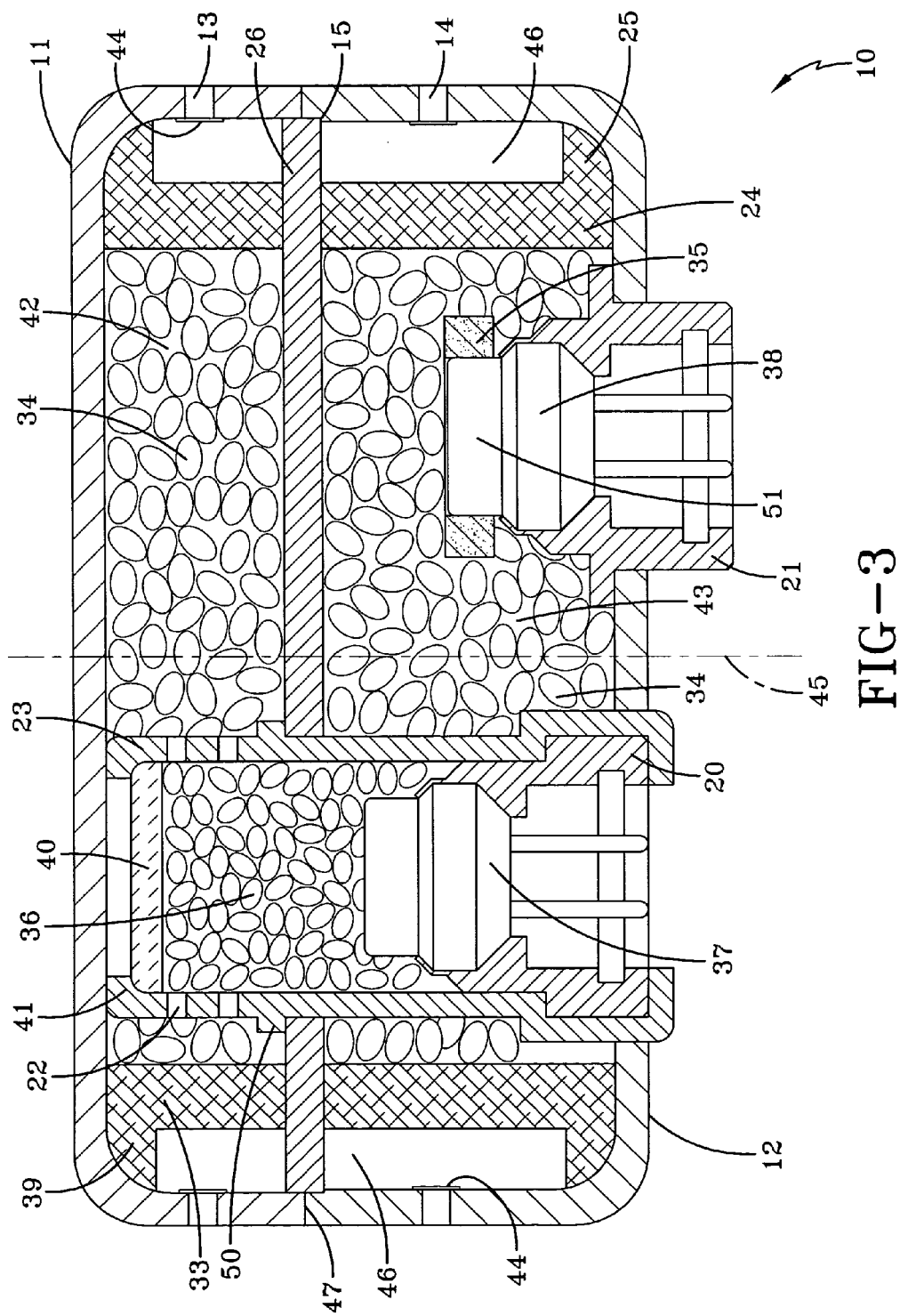
FIG. 3 shows a cross section of an alternative embodiment of the inflator in the present invention.

FIG. 3 shows an alternate embodiment of the inflator 10 of the present invention whereby the first combustion chamber 42 has a smaller volume than the second combustion chamber 43. It is contemplated in the present invention that the first combustion chamber 42 may have the same volume as the second combustion chamber 43. The divider plate in the inflator 10 shown in FIG. 3 is in closer proximity to the upper housing 11 than the inflator 10 shown in FIG. 1. Another difference between the inflator 10 in FIG. 3 and FIG. 1 is the position of the first igniter 37. The first igniter 37 is flush with the end of the lower housing 12 in the inflator shown in FIG. 3 whereas the first igniter 37 protrudes past the end of the lower housing 12 in the inflator shown in FIG. 1. Additionally, the enhancer tube 23 in the inflator shown in FIG. 3 has a flange 50 which serves the function of preventing inflation gas from one combustion chamber from leaking into the other combustion chamber. Also, the flange 50 reduces the bending of the divider plate 26 in the direction of the upper housing 11 during periods when the internal pressure of the second combustion chamber 43 is less than the first combustion chamber 42.

The operation of the inflator 10 in the present invention is now set forth. At the onset of a crash, the electronic control unit (not shown) transmits a firing signal to the inflator 10. There are several different firing scenarios contemplated in the present invention: single staged output, delayed output, and full output. Single stage output occurs where only the first igniter 37 receives a firing signal, which results in inflation gas from the first combustion chamber 42 being released. Delayed output is the situation where the first igniter 37 is actuated, and after a predetermined amount of time, the second igniter 38 is ignited. Delayed output may also occur when the second igniter 38 is actuated, and after a predetermined amount of time, the first igniter 27 is ignited. Full output exists when the first igniter 37 and the second igniter 38 are fired simultaneously.

Upon receipt of an electrical signal, the first igniter 37 is actuated whereby the ignition material is ignited, which in turn ignites the enhancer pellets 36. The hot combustion gases from the burning of the enhancer pellets 36 quickly flow through the enhancer tube 23 holes into the first combustion chamber 42. Consequently, the gas generant 34 in the first combustion chamber 42 is lit whereby the inflation gas travels through the first filter 33 and out of the inflator 10 via the first exit ports 13. Upon receipt of an electrical signal, the second igniter 38 is actuated, which in turn ignites the enhancer donut 35. The hot combustion gases from the burning of the enhancer donut 35 cause the ignition of the gas generant 34 in the second combustion chamber 43. The hot inflation gases pass through the second filter 24 and out then travel through the second exit ports 14.

In the event that the inflator 10 is exposed to a fire or other another source of extreme heat, the inflator 10 is designed to autoignite and function in a normal manner. An autoignition element (not shown) may be placed in intimate thermal contact with the lower housing 12 and another autoignition element may be placed in intimate thermal contact with the upper housing 11. In the event of exposure to high temperature, the autoignition elements ignite the gas generant in the first and second combustion chambers. If an autoignition element was not present in the inflator, the gas generant may melt which would alter the ballistic properties of the gas generant.

In all cases it is understood that the above-described embodiments are merely illustrative of but a few of the many possible specific embodiments which represent the applications of the principles of the present invention. Numerous and varied other arrangements can be readily devised by those skilled in the art without departing from the spirit and scope of the invention.

We claim:

1. An inflator comprising:
    a first igniter for igniting a gas generant disposed in a first combustion chamber;
    a second igniter for igniting a gas generant disposed in a second combustion chamber;
    a divider plate for dividing the inflator into the first combustion chamber and the second combustion chamber, the divider plate has an opening therethrough located off center axis, the divider plate has a generally flat shape therewith, wherein the divider plate prevents sympathetic ignition of the gas generant, the divider plate having a cylindrical protrusion extending in the direction of the upper housing whereby the cylindrical protrusion engages with the enhancer tube; and
    a single enhancer tube extending from the first combustion chamber to the second combustion chamber through the opening of the divider plate, wherein the lower housing has a plurality of second exit ports arranged around the circumference thereof, the upper housing has a plurality of first exit ports arranged around the circumference thereof, an inflation gas produced by the burning of the gas generant in the first combustion chamber flows out of the inflator via the first exit ports, and an inflation gas produced by the burning of the gas generant in the second combustion chamber flows out of the inflator via the second exit ports.

2. The inflator according to claim 1 further comprising a lower housing and an upper housing whereby the lower housing is securely attached to the upper housing, the divider plate radially interfaces with an inner surface of the joint around the entire inflator.

3. The inflator according to claim 1 wherein the divider plate is situated between the first exit ports and the second exit ports.

4. The inflator according to claim 1 wherein the enhancer tube has an annular flange contacting a surface of the divider plate facing the upper housing.

5. The inflator according to claim 1 further comprising an enhancer donut press fit against the metal cup of the second igniter.

6. The inflator according to claim 5 wherein the divider plate has a recess for partially receiving the enhancer donut, the recess is situated off center axis.

7. The inflator according to claim 1 further comprising a first filter for trapping solid particles produced from the combustion of the gas generant in the first combustion chamber, the first filter has an enlarged portion on a peripheral end opposite the divider plate.

8. The inflator according to claim 1 further comprising a second filter for trapping solid particles produced from the combustion of the gas generant in the second combustion chamber, the second filter has an enlarged portion on a longitudinal end distal from the divider plate.

9. The inflator according to claim 1 wherein the enhancer tube has a plurality of enhancer tube holes arranged around the circumference thereof, the enhancer tube holes provide a passageway between the first combustion chamber and an interior volume of the enhancer tube.

10. An inflator comprising:
    an lower housing having a plurality of second exit ports arranged around the circumference thereof;
    a upper housing having a plurality of first exit ports arranged around the circumference thereof;
    a divider plate fixedly attached to a circumferential joint between the lower housing and the upper housing, the divider plate is disposed below a plane through the second exit ports, the divider plate is disposed above a plane through the first exit ports, the divider plate having a cylindrical protrusion extending toward the upper housing whereby the cylindrical protrusion engages with the enhancer tube;
    a first combustion chamber having gas generant situated above the divider plate; and
    a second combustion chamber having gas generant situated below the divider plate, wherein the divider plate prevents sympathetic ignition of the gas generant.

11. The inflator according to claim 10 wherein the divider plate radially interfaces with an inner surface of the circumferential joint around the entire inflator.

12. The inflator according to claim 10 wherein the divider plate has an opening therethrough located off center axis, wherein the divider plate has a generally flat shape therewith.

13. The inflator according to claim 10 wherein the divider plate has a recess for partially receiving an enhancer donut, the recess is situated off center axis.

14. The inflator according to claim 10 further comprising a first filter for trapping solid particles produced from the combustion of the gas generant in the first combustion chamber, the first filter has an enlarged portion on a longitudinal end distal from the divider plate.

15. The inflator according to claim 10 further comprising a second filter for trapping solid particles produced from the combustion of the gas generant in the second combustion chamber, the second filter has an enlarge portion on a peripheral end opposite the divider plate.

16. The inflator according to claim 10 wherein the enhancer tube has a plurality of enhancer tube holes arranged around the circumference thereof, the enhancer tube holes provide a passageway between the first combustion chamber and an interior volume of the enhancer tube.

* * * * *